United States Patent Office 2,695,290
Patented Nov. 23, 1954

2,695,290

DERIVATIVES OF INDOLE AND METHOD FOR THE PRODUCTION THEREOF

Jacob Finkelstein, East Paterson, and John Lee, Essex Fells, N. J., assignors to Hoffmann-La Roche Inc., Roche Park, Nutley, N. J., a corporation of New Jersey No Drawing. Application March 28, 1952, Serial No. 279,254

7 Claims. (Cl. 260—240)

This invention relates to the production of 1-methyl-2-[β-3-indoyl)ethyl]piperidine and ethyl 1-methyl-6-[β-(3-indolyl)ethyl]nipecotate which can also be designated as 3-carbethoxy-1-methyl-6-[β-(3-indoyl)ethyl]piperidine and salts thereof. The novel compounds are oxytocics, having activity related to that of the ergot alkaloids, for example, ergometrine.

The compounds can be synthesized by reacting indole-3-aldehyde I with the corresponding picolinium methyl quaternary salts, for example, with α-picoline methiodide II (R=H, X=iodide), whereupon 1-methyl-2-[β-(3-indolyl)vinyl]pyridinium iodide III (R=H, X=iodide) is obtained; or with 3-carbethoxy-1,6-dimethylpyridinium p-toluenesulfonate II (R=COOC₂H₅, X=p-toluenesulfonate), whereupon 3-carbethoxy-1-methyl-6-[β-(3-indolyl)vinyl]pyridinium p-toluenesulfonate III (R=COOC₂H₅

X=p-toluenesulfonate) is obtained. Upon catalytically reducing the vinyl component III, there is obtained 1-methyl-2-[β-(3-indolyl)ethyl]piperidine IV (R=H) and ethyl-1-methyl-6-[β-(3-indolyl)ethyl]nipecotate IV (R=COOC₂H₅). The free bases can readily be converted to any of the acid addition salts by treatment with an appropriate acid, for example, by treating the compounds dissolved in a suitable solvent, such as ether, with hydrogen chloride; or they can be quaternized by treatment with a suitable quaternizing agent, for example, methyl iodide.

The following scheme will serve to represent the reactions involved in the preparation of the novel compounds:

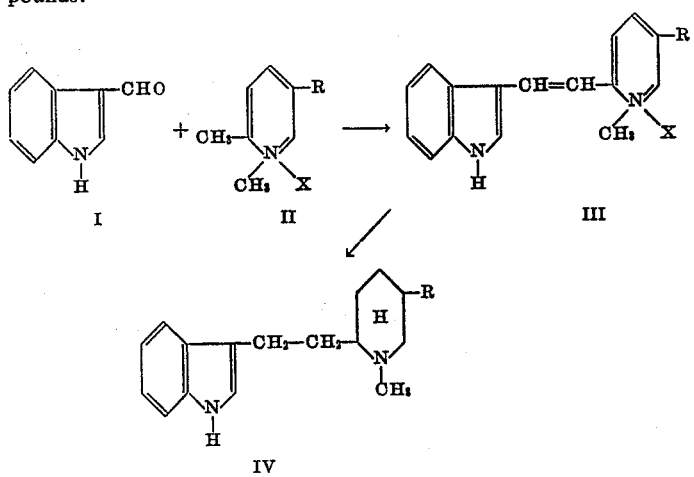

The following examples will serve to illustrate the production of the intermediates as well as the final products. The intermediates are also embraced within the scope of our invention.

EXAMPLE 1

(a) *1-methyl-2-[β-(3-indolyl)vinyl]pyridinium iodide*

A suspension of 11.0 grams of α-picoline methiodide and 6.5 grams of indole-3-aldehyde in 25 cc. of absolute alcohol, containing 2 cc. of dry piperidine, was refluxed. As the mixture warmed up, the reaction product dissolved, and after 10 minutes of refluxing, a crystalline product began to form. The refluxing was continued for an additional hour and cooled. The product was collected and purified by recrystallization from methanol. The 1-methyl-2-[β-(3-indolyl)vinyl] pyridinium iodide melted at 265–267° C. with decomposition.

(b) *1-methyl-2-[β-(3-indolyl)ethyl]piperidine*

A suspension of 41 grams of 1-methyl-2-[β-(3-indolyl)-vinyl]pyridinium iodide in 1 liter of 95% alcohol containing 100 mg. of platinum oxide catalyst was reduced with hydrogen at 50° C. under 200 lbs. per square inch pressure. The reduction proceeded at a rapid rate and came to a stop when the theoretical amount of hydrogen was absorbed. The reddish solution was filtered from the catalyst and concentrated on the steam bath to a small volume after the solution was made alkaline to phenolphthalein with dilute sodium hydroxide. The oil thus produced was extracted with ether, the ether extract was dried, concentrated, and the colorless crystalline residue was purified by recrystallization from benzene. The 1-methyl-2-[β-(3-indolyl)ethyl]piperidine had a M. P. of 138–140° C. The methiodide thereof was prepared by refluxing a benzene solution thereof with methyl iodide. Recrystallized from methanol, the colorless crystals of 1-methyl-2-[β-(3-indolyl)ethyl]piperidine methiodide acquired a pinkish cast, M. P. 246–248° C.

EXAMPLE 2

(a) *3-carbethoxy-1,6-dimethylpyridinium iodide*

A solution of 5.85 grams of ethyl 6-methylnicotinate in 50 cc. of absolute alcohol was heated with excess methyl iodide in a sealed tube at 100° C. for 3 hours. The cooled solution was left standing at 0° C. and the 3-carbethoxy-1,6-dimethylpyridinium iodide crystallized. Upon recrystallization from ethanol, it melted at 152–153° C.

(b) *3-carbethoxy-1-methyl-6-[β-(3-indolyl)vinyl]-pyridinium iodide*

A mixture of 5.5 grams of 3-carbethoxy-1,6-dimethyl-pyridinium iodide, 2.6 grams of indole-3-aldehyde in 15 cc. of absolute alcohol, and 1 cc. of dry piperidine was refluxed. Reaction took place very quickly, and a red crystalline product soon formed. The reaction was terminated after one-half hour. The product, 3-carbethoxy-1-methyl-6-[β-(3-indolyl)vinyl]pyridinium iodide melted at 260–265° C.

EXAMPLE 3

(a) *3-carbethoxy-1-methyl-6-[β-(3-indolyl)vinyl]-pyridinium p-toluenesulfonate*

A solution of 18.6 grams of methyl-p-toluenesulfonate and 16.5 grams of ethyl 6-methylnicotinate was refluxed in dry xylene for 1 hour and cooled. The xylene was decanted and the residue triturated with acetone to obtain crystalline 3-carbethoxy-1,6-dimethylpyridinium p-toluene sulfonone, M. P. 120–122° C.

A solution of 7.25 grams of indole-3-aldehyde and 17.6 grams of 3-carbethoxy-1,6-dimethylpyridinium p-toluenesulfonate in 50 cc. of absolute alcohol, and 1 cc. of dry piperidine, was refluxed for 3 hours. A red crystalline substance was obtained. The substance was recrystallized from 50% alcohol-water mixture. 3-carbethoxy-1-methyl-6-[β-(3-indolyl)vinyl]pyridinium p-toluenesulfonate was obtained as brown glistening crystals, M. P. 294–297° C. with decomposition.

(b) *Ethyl-1-methyl-6-[β-(3-indolyl)ethyl]nipecotate hydrochloride*

A suspension of 14 grams of 3-carbethoxy-1-methyl-6-[β-(3-indolyl)vinyl]pyridinium p-toluenesulfonate in 300 cc. of 95% alcohol was reduced with hydrogen at 50° C. under 200 lbs. pressure per square inch in the presence of 100 mg. of platinum oxide catalyst. The clear colorless solution which resulted was concentrated in vacuo under nitrogen. The residue was treated with water, made alkaline with N sodium hydroxide solution, and the oil, comprising ethyl 1-methyl-6-[β-(3-indolyl)-ethyl]nipecotate was extracted with ether. The ether solution was thoroughly dried and saturated with dry hydrogen chloride gas to produce the colorless hydrochloride. Upon crystallization from ethanol, the ethyl 1-methyl-6-[β-(3-indolyl)ethyl]nipecotate hydrochloride melted at 193–195° C.

We claim:
1. A compound selected from the group consisting of those having the formula

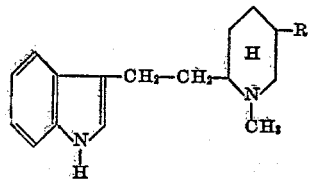

where R is a member of the group consisting of hydrogen and carbethoxy and the salts thereof.
2. 1-methyl-2-[β-(3-indolyl)ethyl]piperidine.
3. 1-methyl-2-[β - (3 - indolyl)ethyl]piperidine methiodide.
4. 3-carbethoxy-1-methyl-6-[β-(3-indolyl)vinyl]pyridinium salt.
5. 3-carbethoxy-1-methyl-6-[β-(3-indolyl)vinyl]pyridinium p-toluenesulfonate.
6. Ethyl 1-methyl-6-[β-(3-indolyl)ethyl]nipecotate.
7. Ethyl 1-methyl-6-[β-(3-indolyl)ethyl]nipecotate hydrochloride.

References Cited in the file of this patent
UNITED STATES PATENTS

| Number | Name | Date |
|---|---|---|
| 2,355,659 | Lee et al. | Aug. 15, 1944 |
| 2,409,612 | Brooker et al. | Oct. 22, 1946 |
| 2,558,777 | Papa et al. | July 3, 1951 |

OTHER REFERENCES

Chem. Abstracts, vol. 36, col. 7240 (1942).
Akkerman et al., Recueil des Trauvaux Chimiques, vol. 70, pp. 899–916 (November 1951).